United States Patent
Ishigaya et al.

(10) Patent No.: US 10,594,437 B2
(45) Date of Patent: Mar. 17, 2020

(54) RECEIVING APPARATUS AND METHOD THEREFOR

(71) Applicant: SONY CORPORATION, Tokyo (JP)

(72) Inventors: Kazuhiro Ishigaya, Kanagawa (JP); Shinji Negishi, Kanagawa (JP); Michito Ishii, Kanagawa (JP); Takehito Watanabe, Tokyo (JP); Yasuyuki Chaki, Kanagawa (JP); Noriaki Ooishi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/756,179

(22) PCT Filed: Sep. 23, 2016

(86) PCT No.: PCT/JP2016/077940
§ 371 (c)(1),
(2) Date: Feb. 28, 2018

(87) PCT Pub. No.: WO2017/061280
PCT Pub. Date: Apr. 13, 2017

(65) Prior Publication Data
US 2018/0248653 A1    Aug. 30, 2018

(30) Foreign Application Priority Data

Oct. 8, 2015  (JP) ................................ 2015-199893

(51) Int. Cl.
*H03M 13/00* (2006.01)
*H04L 1/00* (2006.01)
(Continued)

(52) U.S. Cl.
CPC .............. *H04L 1/0046* (2013.01); *H04L 1/00* (2013.01); *H04L 1/0045* (2013.01);
(Continued)

(58) Field of Classification Search
CPC ..... H04L 1/0046; H04L 1/00; H04N 21/4343; H04N 21/4382
See application file for complete search history.

(56) References Cited

U.S. PATENT DOCUMENTS

| | | | | |
|---|---|---|---|---|
| 6,397,000 B1 * | 5/2002 | Hatanaka | ............. | H04N 9/7921 386/327 |
| 8,261,162 B2 * | 9/2012 | Doi | ................... | H03M 13/2906 714/746 |

(Continued)

FOREIGN PATENT DOCUMENTS

| JP | 2007-282001 A | 10/2007 |
|---|---|---|
| JP | 2008-312125 A | 12/2008 |

(Continued)

OTHER PUBLICATIONS

International Search Report and Written Opinion of PCT Application No. PCT/JP2016/077940, dated Nov. 8, 2016, 09 pages.

*Primary Examiner* — Esaw T Abraham
(74) *Attorney, Agent, or Firm* — Chip Law Group

(57) ABSTRACT

The present disclosure relates to a receiving apparatus and a method therefor which are capable of decreasing a processing load and efficiently improving reproduction quality. A packet accumulating unit stores packets and packet type, and another packet information. A statistics information accumulating unit accumulates statistics information (e.g., an error ratio, performance (processing condition) of the receiving apparatus, a condition of a stream, and a condition of a buffer). A packet-correcting-method selecting unit selects a packet correcting method from a packet correction table generated in accordance with the packet information and packet identification/statistics information from the statistics information accumulating unit, and supplies a packet to be corrected to a packet correcting unit in a case where the packet in process is determined to be a target of correction.

(Continued)

For example, the present disclosure can be applied to a communication system that transmits and receives data.

6 Claims, 17 Drawing Sheets

(51) Int. Cl.
    *H04N 21/442*      (2011.01)
    *H04N 21/438*      (2011.01)
    *H04N 21/4425*      (2011.01)
    *H04N 21/434*      (2011.01)
    *H04L 1/18*      (2006.01)
    *H04N 21/4385*      (2011.01)

(52) U.S. Cl.
    CPC ..... *H04N 21/4343* (2013.01); *H04N 21/4382* (2013.01); *H04N 21/442* (2013.01); *H04N 21/4425* (2013.01); *H04L 1/1867* (2013.01); *H04L 2001/0097* (2013.01); *H04N 21/4344* (2013.01); *H04N 21/4385* (2013.01)

(56) References Cited

U.S. PATENT DOCUMENTS

| | | | |
|---|---|---|---|
| 8,335,281 B2 * | 12/2012 | Soga | H04B 7/08 375/340 |
| 8,381,059 B2 * | 2/2013 | Resnick | G06F 11/1004 361/760 |
| 8,446,812 B2 * | 5/2013 | Nakao | H04L 1/0006 370/203 |
| 8,910,008 B2 * | 12/2014 | Hamada | H04L 25/4908 714/748 |
| 9,172,995 B2 * | 10/2015 | Matsunaga | H04N 9/8042 |
| 9,268,636 B2 * | 2/2016 | Chung | G06F 11/1048 |
| 9,632,856 B2 * | 4/2017 | Chung | G06F 11/1048 |
| 9,634,799 B2 * | 4/2017 | Hamada | H04L 1/0045 |
| 2008/0309825 A1 | 12/2008 | Utagawa | |

FOREIGN PATENT DOCUMENTS

| | | |
|---|---|---|
| JP | 2011-071800 A | 4/2011 |
| JP | 2013-207722 A | 10/2013 |

* cited by examiner

FIG. 8

| | | Descriptor |
|---|---|---|
| 1 | nal_unit(NumBytesInNALunit) { | |
| 2 |   forbidden_zero_bit | f(1) |
| 3 |   nal_ref_idc | u(2) |
| 4 |   nal_unit_type | u(5) |
| 5 |   NumBytesInRBSP=0 | |
| 6 |   for(i=0; i<NumBytesInNALunit; i++) { | |
| 7 |     if(i+2<NumBytesInNALunit && next_bits(24) == 0x000003) { | |
| 8 |       rbsp_byte[NumBytesInRBSP++] | b(8) |
| 9 |       rbsp_byte[NumBytesInRBSP++] | b(8) |
| 10 |       i += 2 | |
| 11 |       emulation_prevention_three_byte | f(8) |
| 12 |     }else | |
| 13 |       rbsp_byte[NumBytesInRBSP++] | b(8) |
| 14 |   } | |
| 15 | } | |

FIG. 9

| | | Descriptor |
|---|---|---|
| 1 | nal_unit_header( ) { | |
| 2 |   forbidden_zero_bit | f(1) |
| 3 |   nal_unit_type | u(6) |
| 4 |   nuh_reserved_zero_6bits | u(6) |
| 5 |   nuh_temporal_id_plus1 | u(3) |
| 6 | } | |

FIG. 16

| Priority | Packet Type | Pict Type | NAL Header nal_unit_type | NAL Header nal_ref_idc |
|---|---|---|---|---|
| High | VideoES | I | IDR | REFERENCE PICTURE |
| High | Section (PAT, PMT) | — | — | — |
| Middle | VideoES | I/P/B | OTHER THAN IDR | REFERENCE PICTURE |
| Low | VideoES | B | OTHER THAN IDR | NON-REFERENCE PICTURE |
| Low | Section (OTHER THAN PAT, PMT) | — | — | — |
| ... | ... | ... | ... | ... |

FIG. 17

| Priority | Packet Type | Pict Type | NAL Header nal_unit_type | NAL Header Temporal ID | SOP Layer |
|---|---|---|---|---|---|
| High | VideoES | I | IDR | 0 | L0 |
| High | Section (PAT, PMT) | — | — | — | — |
| Middle | VideoES | I/P/B | OTHER THAN IDR | 0 | L1/L2/L3 |
| Middle | VideoES | B | OTHER THAN IDR | 1 | L3 |
| Middle | VideoES | B | OTHER THAN IDR | 1 | L2 |
| Middle | VideoES | B | OTHER THAN IDR | 2 | L3 |
| Low | VideoES | B | OTHER THAN IDR | 3 | L1/L2/L3 |
| Low | Section (OTHER THAN PAT, PMT) | — | — | — | — |
| ... | ... | ... | ... | ... | ... |

RECEIVING APPARATUS AND METHOD THEREFOR

CROSS REFERENCE TO RELATED APPLICATIONS

This application is a U.S. National Phase of International Patent Application No. PCT/JP2016/077940 filed on Sep. 23, 2016, which claims priority benefit of Japanese Patent Application No. JP 2015-199893 filed in the Japan Patent Office on Oct. 8, 2015. Each of the above-referenced applications is hereby incorporated herein by reference in its entirety.

TECHNICAL FIELD

The present disclosure relates to a receiving apparatus and a method therefor, and particularly to a receiving apparatus and a method therefor which are capable of decreasing a processing load and efficiently improving reproduction quality.

BACKGROUND ART

In a conventional way of receiving broadcasting content, error correction of bit errors that have been generated during transmission is performed during restoration of a stream, while a transport layer is multiplexed/separated and decoding/display process is performed.

Here, in a situation where transmission quality is poor and a demodulator does not sufficiently correct errors, a multiplexing/separating unit of the transport layer cannot extract packets correctly because of the packet error, causing discontinuous reproduction or the like due to partial data loss in a video/audio AccessUnit (AU).

In addition, in a case where a packet describing stream information, especially PAT, PMT, or the like in SI/PSI is extracted, the entire control of a receiver would be affected, causing a delay in controlling reproduction of the content, for example.

Correspondingly, Patent Document 1 proposes a method for estimating and repairing a packet error by taking a TS as an example.

CITATION LIST

Patent Document

Patent Document 1: Japanese Patent Application Laid-Open No. 2013-207722

SUMMARY OF THE INVENTION

Problems to be Solved by the Invention

Error detection and error correction, however, largely depend on a processing load according to the proposal recited in Patent Document 1. To implement the error detection and the error correction in an actual receiver, it has been necessary to examine a more efficient method to meet the cost and effect depending on the situation.

The present disclosure has been made in view of such a situation to decrease the processing load and efficiently improve reproduction quality.

Solutions to Problems

A receiving apparatus according to one aspect of the present technology includes an extracting unit that extracts packet information from a stream including video data, audio data, and control information, an error detecting unit that detects a packet error in the stream, a correcting method selecting unit that selects a correcting method of the packet error detected by the error detecting unit in accordance with the packet information extracted by the extracting unit and the condition of the receiving process, and a correcting unit that corrects the packet error detected by the error detecting unit in accordance with the correcting method selected by the correcting method selecting unit.

The receiving apparatus further includes an accumulating unit that accumulates the packet information extracted by the extracting unit, in which the correcting unit estimates a bit pattern from the packet information accumulated in the accumulating unit and corrects syntax to correct the packet error detected by the error detecting unit.

The receiving apparatus further includes a correction table generating unit that generates a correction table assigned with priority for correction in accordance with the packet information extracted by the extracting unit, in which the correcting method selecting unit selects the correcting method of the packet error detected by the error detecting unit at least in accordance with the correction table generated by the correction table generating unit or the condition of the receiving process.

The packet information may include packet type information.

The correcting method includes at least one of a target of correction, a range of correction, and accuracy of correction.

A receiving method according to another aspect of the present technology includes causing a receiving apparatus to perform extracting packet information from a stream including video data, audio data, and control information, detecting a packet error in the stream, selecting a correcting method of the detected packet error in accordance with the extracted packet information and the condition of a receiving process, and correcting the detected packet error in accordance with the selected correcting method.

In one aspect of the present technology, the packet information is extracted from the stream including video data, audio data, and control information, and the packet error is detected in the stream. Then, the correcting method is selected in accordance with the extracted packet information and the condition of the receiving process, and the detected packet error is corrected in accordance with the selected correcting method.

Effects of the Invention

The present technology can decrease the processing load and efficiently improve the reproduction quality.

It is noted that an effect described in the present specification is only exemplification, the effect of the present technology is not limited to that described in the present specification, and an additional effect may also be provided.

BRIEF DESCRIPTION OF DRAWINGS

FIG. 8 is an example NAL structure according to H.264/AVC.

FIG. 9 is an example NAL structure according to H.265/HEVC.

FIG. 16 is an example packet correction table according to H.264/AVC.

FIG. 17 is an example of packet correction table according to H.265/HEVC.

MODE FOR CARRYING OUT THE INVENTION

Modes for embodying the present technology (hereinafter referred to as an embodiment) will be described below.

<Example Configuration of Present Technology>

Figure 1:
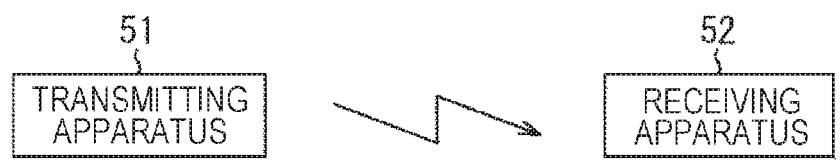
FIG. 1 is a system configuration example of a communication system to which the present technology is applied.

FIG. 1 is a system configuration example of a communication system to which the present technology is applied.

The communication system of FIG. 1 is configured to include a transmitting apparatus 51 and a receiving apparatus 52. The transmitting apparatus 51 packetizes and multiplexes video/audio data and control information, and transmits the packetized data and information as a multiplexed stream. The receiving apparatus 52 receives the multiplexed stream from the transmitting apparatus 51, extracts packet information, detects and corrects errors, and then executes tasks such as reproduction/viewing, recording, and retransmission.

It is noted that transmission by the transmitting apparatus 51 and retransmission by the receiving apparatus 52 are substantially similar processes.

<Configuration Example of Receiving Apparatus>

Figure 2:
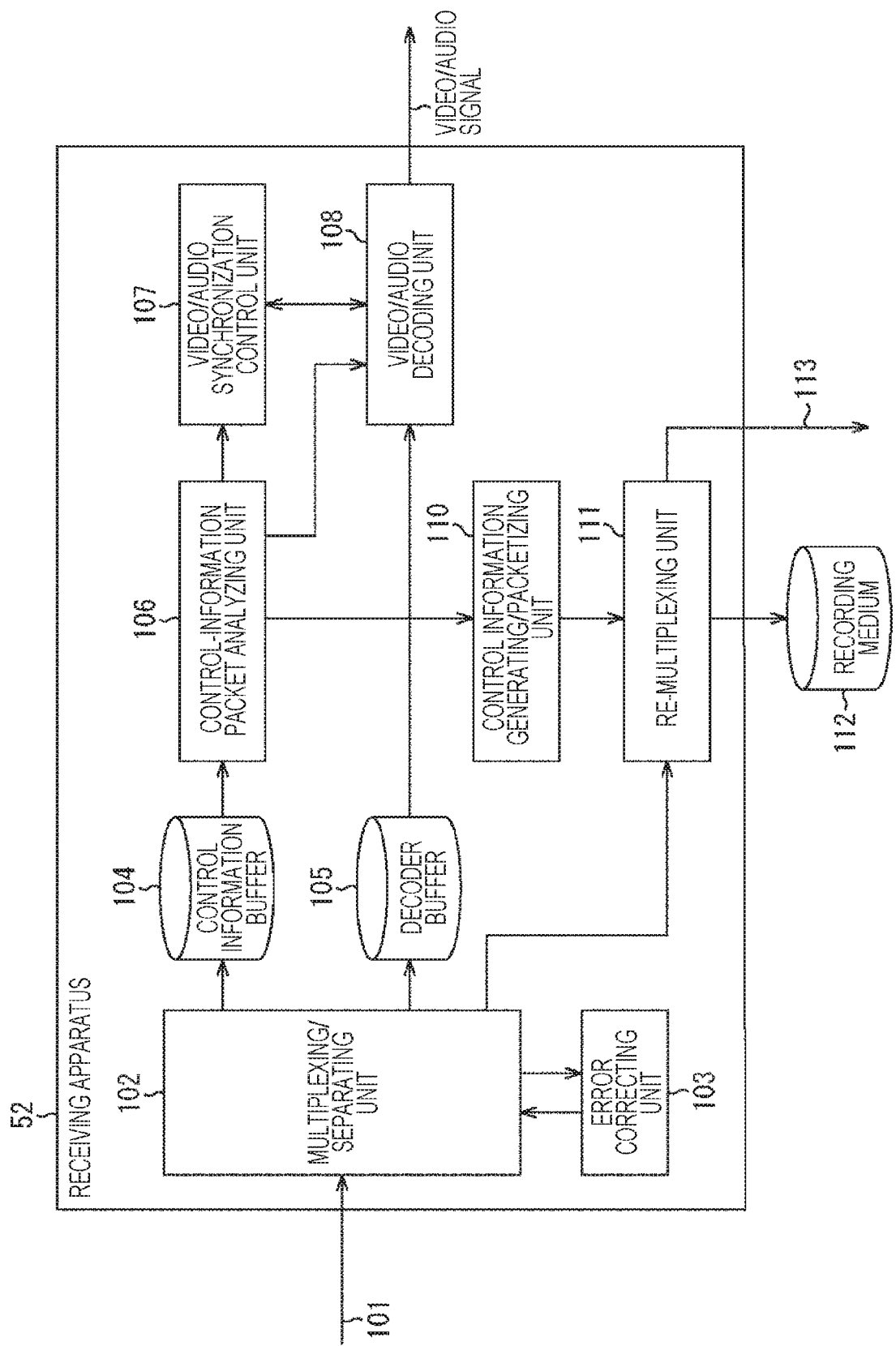
FIG. 2 is a block diagram illustrating a configuration example of a receiving apparatus to which the present technology is applied.

FIG. 2 is a block diagram of an example configuration of a receiving apparatus.

The receiving apparatus 52 includes a multiplexing/separating unit 102, an error correcting unit 103, a control information buffer 104, a decoder buffer 105, a control-information packet analyzing unit 106, a video/audio synchronization control unit 107, a video/audio decoding unit 108, a control information generating/packetizing unit 110, and a re-multiplexing unit 111. The receiving apparatus 52 performs error correction in a system layer (e.g., syntax).

An external multiplexed stream 101 is input to the multiplexing/separating unit 102. The multiplexing/separating unit 102 performs pattern matching of packets and causes the error correcting unit 103 to correct errors and separate the error-corrected multiplexed stream into control information and video/audio data. The multiplexing/separating unit 102 supplies the separated control information to the control information buffer 104. The multiplexing/separating unit 102 generates an access unit (AU) from the separated video/audio data, and supplies the AU of the video/audio data to the decoder buffer 105. It is noted that, in a case of recording/retransmission, the multiplexing/separating unit 102 supplies the separated video/audio data packets to the re-multiplexing unit 111.

The error correcting unit 103 identifies the packet having an error, selects a packet correcting method in accordance with a packet table generated in accordance with the packet information or statistics information, and supplies the uncorrected packet as it is to the multiplexing/separating unit 102. The packet correcting method includes, for example, a target (priority range) of correction, type, and accuracy of correction. If a packet is regarded as a target of correction, the error correcting unit 103 corrects the target packet of correction, and supplies the corrected packet to the multiplexing/separating unit 102.

The control information buffer 104 accumulates the control information separated by the multiplexing/separating unit 102. The decoder buffer 105 accumulates AU of the video/audio that has been separated and generated by the multiplexing/separating unit 102.

The control-information packet analyzing unit 106 analyzes SI/PSI from the control information from the control information buffer 104, extracts and restores the time information, and supplies the time information to the video/audio synchronization control unit 107, the video/audio decoding unit 108, and the control information generating/packetizing unit 110.

The video/audio synchronization control unit 107 associates the time information that has been extracted and restored by the packet analysis with the video/audio AU, and decodes the video/audio AU of the decoder buffer 105 to the video/audio decoding unit 108.

The video/audio decoding unit 108 decodes the video/audio AU and outputs a video/audio signal to a unit, such as a display unit which is disposed in the subsequent stage but is not illustrated in the drawings.

The control information generating/packetizing unit 110 regenerates the control information corresponding to the multiplexed stream to be generated using the information from the control-information packet analyzing unit 106, and supplies the packetized control information to the re-multiplexing unit 111. The re-multiplexing unit 111 re-multiplexes the video/audio data packets that are necessary for multiplexing and the control information packet from the control information generating/packetizing unit 110, and transmits the multiplexed stream 113 to the outside which is not illustrated or records the multiplexed stream 113 in a recording medium 112.

<Configuration Example of Error Correcting Unit>

Figure 3:
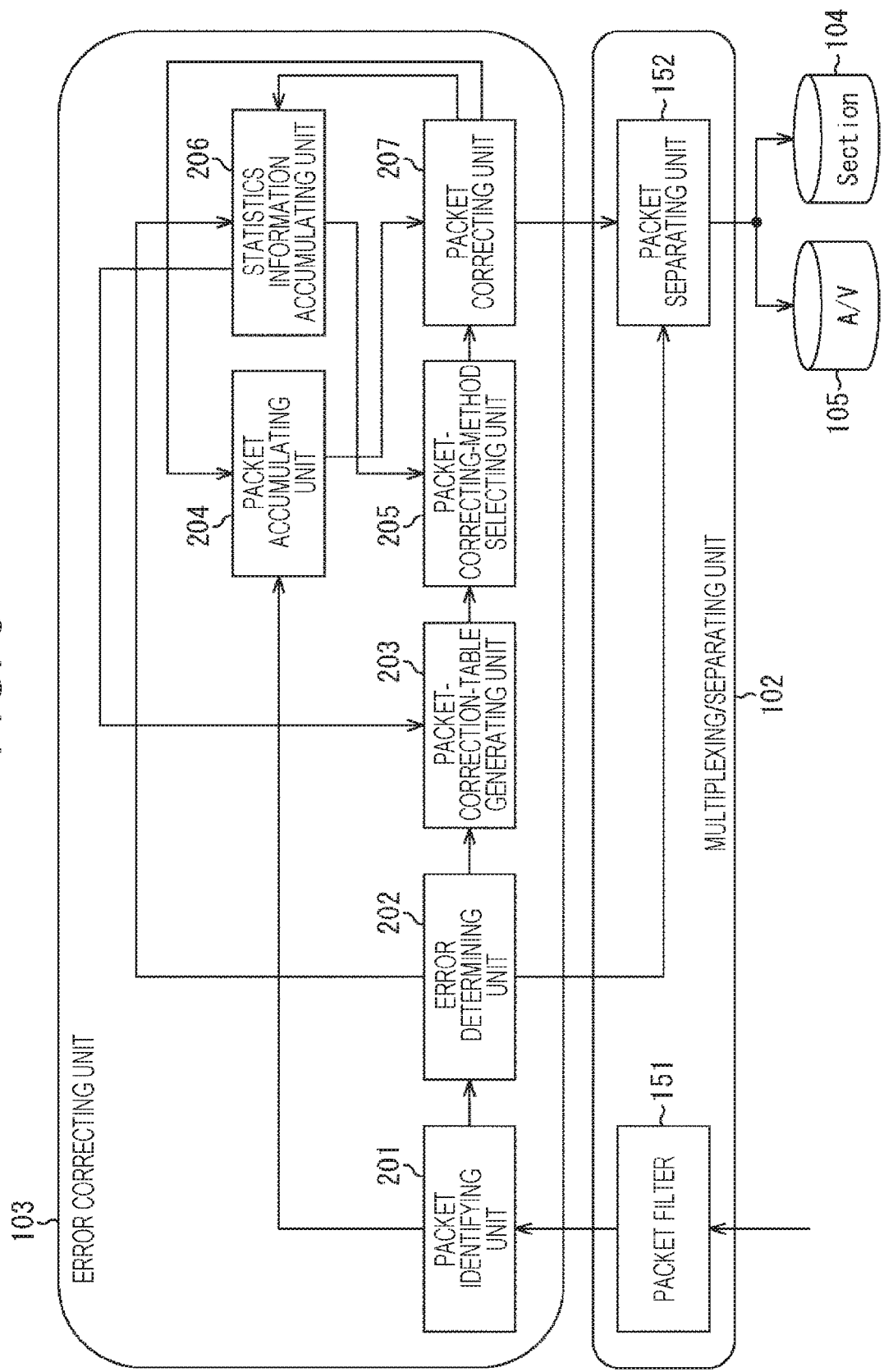
FIG. 3 is a block diagram illustrating a configuration example of an error correcting unit.

FIG. 3 is a block diagram illustrating a configuration example of an error correcting unit. It is noted that the example of FIG. 3 illustrates constituent components of the multiplexing/separating unit 102 related to error correction.

The multiplexing/separating unit 102 includes a packet filter 151 and a packet separating unit 152. The error correcting unit 103 includes a packet identifying unit 201, an error determining unit 202, a packet-correction-table generating unit 203, a packet accumulating unit 204, a packet-correcting-method selecting unit 205, a statistics information accumulating unit 206, and a packet correcting unit 207.

The multiplexed stream is input to the packet filter 151. The packet filter 151 extracts a packet necessary for reproduction, recording, or retransmission from the multiplexed stream, and supplies the extracted packet to the packet identifying unit 201. Here, only the minimum filtering, such as PacketID, is performed to delete unnecessary data of the target of error correction, but it may also be possible to pass all data to extract the error more accurately.

The packet identifying unit 201 performs identifying process for each format of the packets from the packet filter 151, extracts the packet type (packet attribute) and other packet information, and stores the information and the packet in the packet accumulating unit 204. The packet identifying unit 201 supplies the packets after the identification process to the error determining unit 202.

The error determining unit 202 detects errors from the packet of the packet identifying unit 201 and outputs the packet which has no error and requires no correction to the packet separating unit 152. If the error is detected and necessary packet has been received, the error determining unit 202 acquires the packet identifying/statistics information from the statistics information accumulating unit 206, and causes the packet-correction-table generating unit 203 to generate a packet correction table.

The packet-correction-table generating unit 203 generates the packet correction table in accordance with the packet from the error determining unit 202 and the packet identifying/statistics information from the statistics information accumulating unit 206, and supplies the generated packet correction table to the packet-correcting-method selecting unit 205.

The packet accumulating unit 204 stores the packet and packet type, and other information of the packet.

The packet-correcting-method selecting unit 205 selects the packet correcting method from the packet correction table and the packet identification/statistics information from the statistics information accumulating unit 206 and, if the packet in process is determined to be a target of correction, supplies the packet to be corrected to the packet correcting unit 207.

The statistics information accumulating unit 206 accumulates statistics information (e.g., error ratio, performance (condition of the process) of the receiving apparatus 52, the condition of the stream, and the condition of the buffer).

If the packet is determined to be the target of correction, the packet correcting unit 207 estimates the bit pattern of the error portion from reference packet information and corrects the packet. The packet correcting unit 207 outputs the corrected packet information to the packet separating unit 152, while storing the corrected packet information in the packet accumulating unit 204 and the statistics information accumulating unit 206.

Among the packets from the error determining unit 202 and the packet correcting unit 207, the packet separating unit 152 supplies the control information packet to the control information buffer 104 and the video/audio data packet to the decoder buffer 105.

<Example Process of Receiving Apparatus>

Figure 4:
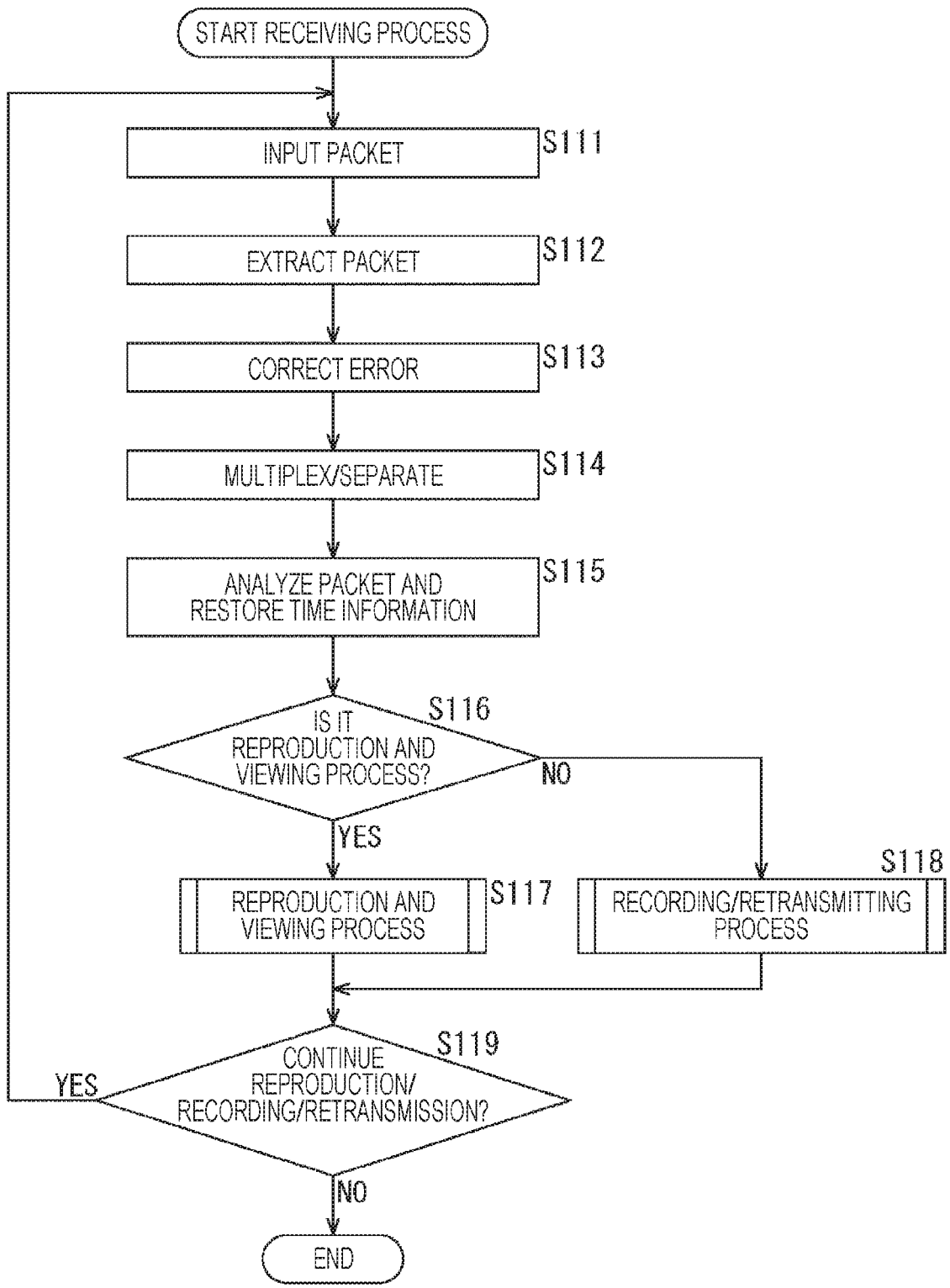
FIG. 4 is a flowchart illustrating a receiving process of the receiving apparatus.

Next, the receiving process of the receiving apparatus 52 is described by referring to the flowchart of FIG. 4.

In step S111, the multiplexing/separating unit 102 inputs external packets of the multiplexed stream 101. In step S112, the packet filter 151 of the multiplexing/separating unit 102 extracts a packet necessary for reproduction, recording, or retransmission from the packets of the multiplexed stream, and supplies the extracted packet to the error correcting unit 103.

In step S113, the error correcting unit 103 corrects errors. Details of the error correction are described later by referring to FIG. 6. It is noted that the error correction is performed in a system layer (syntax). In the process of step S113, the corrected packet is output to the packet separating unit 152.

In addition, the packets having no errors and the packet requiring no correction are also output to the packet separating unit 152.

In step S114, the packet separating unit 152 separates the multiplexed stream (packets) whose error has been corrected by the error correcting unit 103 into the control information and the video/audio data. The multiplexing/separating unit 102 supplies the separated control information to the control information buffer 104. The multiplexing/separating unit 102 generates an access unit (AU) from the separated video/audio data, and supplies the AU of the video/audio data to the decoder buffer 105. It is noted that, in a case of recording/retransmission, the multiplexing/separating unit 102 supplies the separated video/audio data packets to the re-multiplexing unit 111.

In step S115, the control-information packet analyzing unit 106 performs packet analysis/restoration of the time information from the control information from the control information buffer 104, and supplies the restored time information to the video/audio synchronization control unit 107, the video/audio decoding unit 108, and the control information generating/packetizing unit 110.

In step S116, the video/audio synchronization control unit 107 determines whether the process is a reproduction and viewing process. If it is determined that the process is the reproduction and viewing process in step S116, the process proceeds to step S117.

In step S117, the video/audio synchronization control unit 107 controls the video/audio decoding unit 108 to perform the reproduction and viewing process. Details of the reproduction and viewing process will be described later by referring to FIG. 5. In the reproduction and viewing process of S117, a video/audio signal is generated and output to a display unit which is provided in the subsequent stage but is not illustrated in the drawings.

Meanwhile, if it is determined in step S116 that the process is not the reproduction and viewing process, the process proceeds to step S118.

In step S118, the control information generating/packetizing unit 110 and the re-multiplexing unit 111 perform the recording/retransmitting process. Details of the recording/retransmitting process will be described later by referring to FIG. 6. By the recording/retransmitting process in step S118, a re-multiplexed multiplexed stream 113 is generated and transmitted to the outside which is not illustrated in the drawings or recorded in a recording medium 112.

In step S119, the multiplexing/separating unit 102 determines whether the reproducing/recording/transmitting process should be continued. If it is determined that the reproducing/recording/transmitting process should be continued in step S119, the process returns to step S111 and the subsequent process steps are repeated. Is it is not determined that the reproducing/recording/transmitting process should not be continued in step S119, the receiving process is finished.

Figure 5:
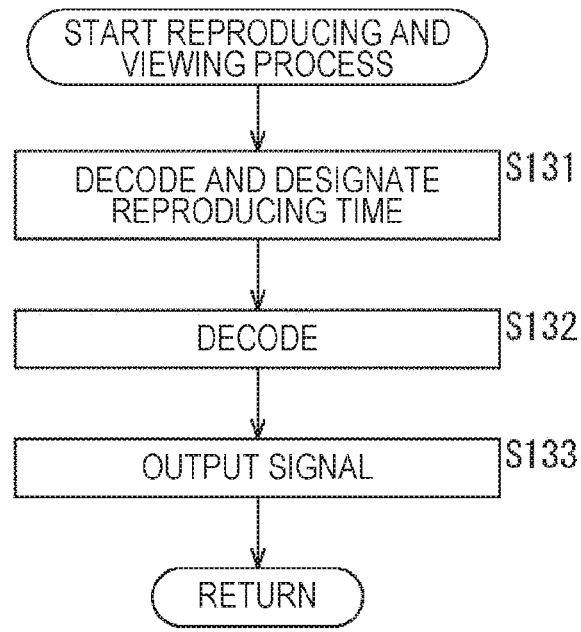
FIG. 5 is a flowchart illustrating a reproduction and viewing process of step S117 of FIG. 4.

Next, the reproducing and viewing process in step S117 of FIG. 4 is described by referring to the flowchart of FIG. 5.

In step S131, the video/audio synchronization control unit 107 associates the time information that has been extracted and restored by the packet analysis with the video/audio AU, in order to decode and designate reproducing time.

In step S132, the video/audio decoding unit 108 decodes the video/audio AU in the decoder buffer 105 under the control of the video/audio synchronization control unit 107.

In step S133, the video/audio decoding unit 108 outputs the video/audio signal generated by the decoding in step S132 to a display unit provided in the subsequent stage but is not illustrated in the drawings.

Figure 6:
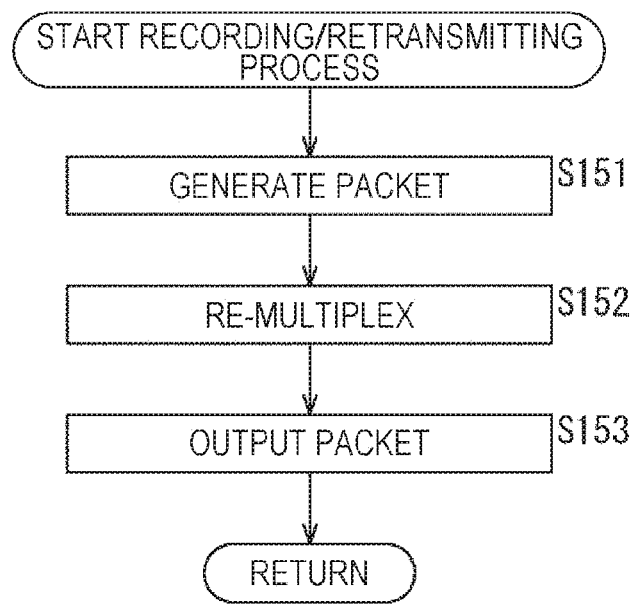
FIG. 6 is a flowchart illustrating a recording/retransmitting process of step S118 of FIG. 4.

Next, the recording/retransmitting process in step S118 of FIG. 4 is described by referring to the flowchart of FIG. 6.

In step S151, the control information generating/packetizing unit 110 packetizes the regenerated control information corresponding to the multiplexed stream to be generated using the information from the control-information packet analyzing unit 106, and supplies the packetized control information to the re-multiplexing unit 111.

In step S152, the re-multiplexing unit 111 re-multiplexes the video/audio data that are necessary for multiplexing and the control information packet from the control information generating/packetizing unit 110.

In step S153, the re-multiplexing unit 111 outputs the packet of the re-multiplexed multiplexed stream 113 to the outside which is not illustrated in the drawings or to the recording medium 112.

Figure 7:
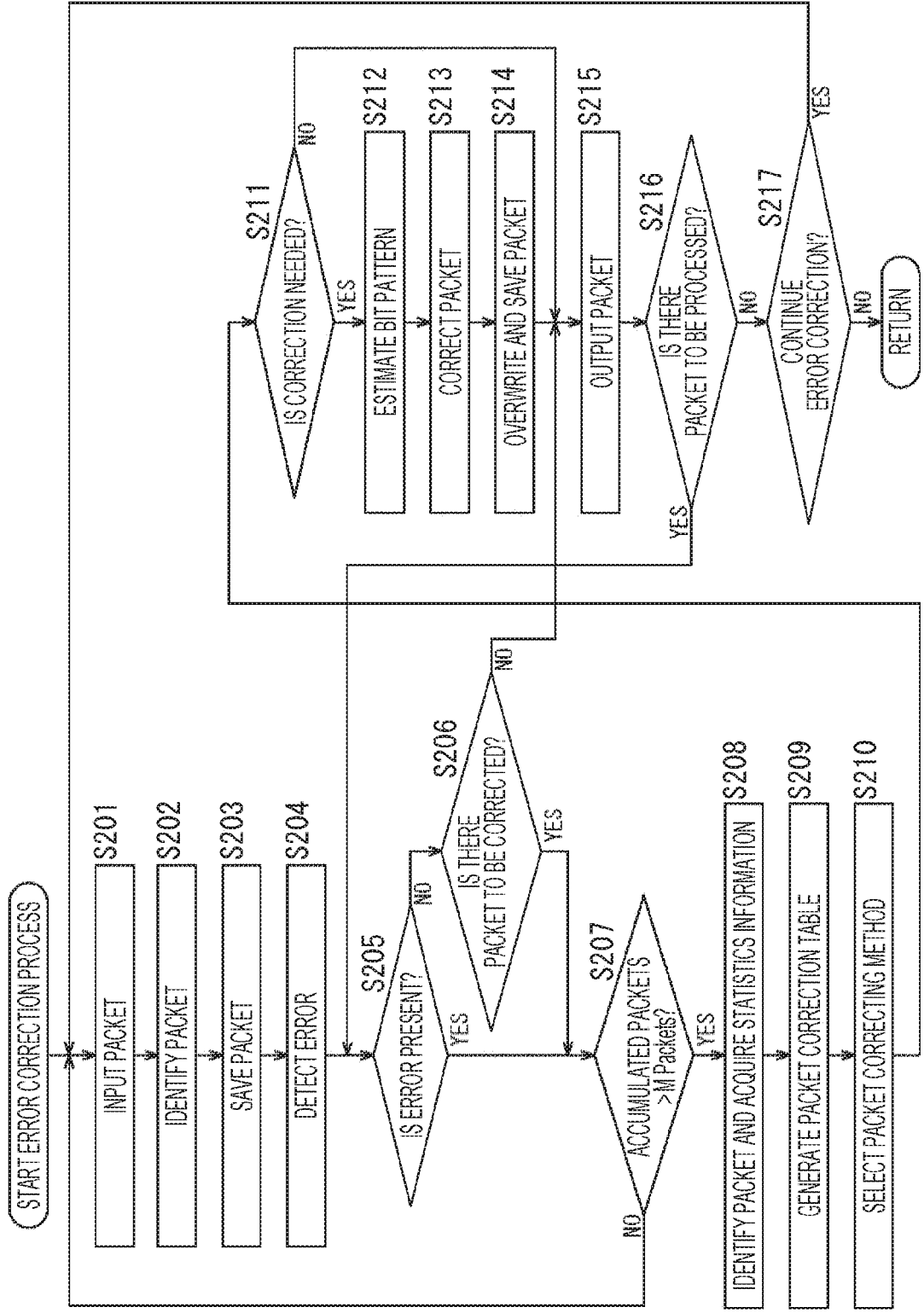
FIG. 7 is a flowchart illustrating an error correcting process of step S113 of FIG. 4.

Next, the error correction process in step S113 of FIG. 4 is described by referring to the flowchart of FIG. 7.

The packet identifying unit 201 inputs packets from the packet filter 151 in step S201, and identifies the packets for each format in step S202.

In step S203, the packet identifying unit 201 stores the packets and packet type, and other information of the packets in a packet accumulating unit 204. In addition, the packet identifying unit 201 supplies the packets after packet identification process to the error determining unit 202.

In step S204, the error determining unit 202 detects errors in the packets from the packet identifying unit 201. In step S205, the error determining unit 202 determines whether the error is present. If it is determined that no error is present in step S205, the process proceeds to step S206.

In step S206, the error determining unit 202 determines whether (this packet is necessary and) there is a packet to be corrected. If it is determined that there is no packet to be corrected in step S206, the process proceeds to step S215. In step S215, the error determining unit 202 outputs those packets that include no errors and are not to be corrected to the packet separating unit 152.

Meanwhile, if it is determined that the error exists in step S205, or that there is a packet to be corrected in step S206, the process proceeds to step S207.

In step S207, the error determining unit 202 determines whether the number of accumulated packets is greater than M packets. If it is determined that the number of the accumulated packets is smaller than M packets in step S207, the process returns to step S201 and the subsequent process steps are repeated.

If it is determined that the number of the accumulated packets is greater than M packets in step S207, the process proceeds to step S208. The error determining unit 202 identifies the packet and acquires the statistics information from the statistics information accumulating unit 206 in step S208, while causing the packet-correction-table generating unit 203 to generate the packet correction table in step S209.

In step S210, the packet-correcting-method selecting unit 205 determines which type of packet or which priority of packet should be corrected, that is, selects a packet correction method (correction range) in accordance with the packet correction table generated in step S209 and the statistics information from the statistics information accumulating unit 206.

In step S211, the packet correcting unit 205 determines whether the packet in process is the target of correction. If it is not determined that the packet in process is the target of correction in step S211, the process proceeds to step S215.

In step S215, the packet correcting unit 205 outputs those packets that are not to be corrected to the packet separating unit 152.

If it is determined that the packet in process is the target of correction in step S211, the process proceeds to step S212. The packet correcting unit 205 estimates the bit pattern from M packets located before and after the packet to be corrected in step S212, and corrects the packet by correcting syntax in step S213.

In step S214, the packet correcting unit 205 overwrites and saves the packet by saving the corrected packet information in the packet accumulating unit 204 and the statistics information accumulating unit 206. In step S215, the packet correcting unit 205 outputs the corrected packet information to the packet separating unit 152.

In step S216, the error determining unit 202 determines whether there is any packet to be processed. If it is determined that there is the packet to be processed in step S216, the process returns to step S205 and the subsequent process steps are repeated.

If it is determined that there is no packet to be processed in step S216, the process proceeds to step S217. In step S217, the packet identifying unit 201 determines whether the error correction should be continued. If it is determined that there is no packet to be processed in step S217, the process returns to step S201 and the subsequent process steps are repeated.

If it is determined that the error correction is not continued in step S217, the error correction process of FIG. 7 is finished.

Next, details of the error correction process of the packet that is performed as described above are described.

<Details of Packet Correction of Present Technology>

In the present technology, the packet correction is performed according to the following procedures.

1. Identify packet type and determine the level of importance of the packet
2. Identify the packet to be corrected
3. Select and execute packet correction

[1. Identify Packet Type and Determine the Level of Importance of the Packet]

The present technology uses a packet type as an index of determining the correcting method to perform packet correction. In one example of identifying the packet type, the header information of, for example, the Network Abstruction Layer (NAL) used in packetizing according to H.264/AVC and H.265/HEVC is used.

FIG. 8 is an example NAL structure of H.264/AVC. Numbers appearing on the left side of the drawing are provided only for the convenience sake.

In H.264/AVC, nal_unit_type and nal_ref_idc, which are parsed in the header of the NAL, are used as identification parameters. In the fourth row of FIG. 8, nal_unit_type is described as an identifier for identifying the type of the NAL, and allowing identification of IDR picture, non-IDR picture, supplemental enhancement information (SEI), sequence parameter set (SPS), or picture parameter set (PPS), for example, for each NAL unit.

Therefore, the levels of importance, for example, constituting the NAL unit can be allocated in such a manner that the highest level is a randomly accessible IDR picture and the subsequent levels are allocated, for example, to the information constituting the pictures, such as SPS and PPS, and the non-IDR picture.

In the third row FIG. 8, nal_ref_idc is described as a flag indicating whether the picture constituting the NAL is a reference picture. Accordingly, the picture corresponding to the non-reference picture is less dependent on other pictures, and is determined to have a lower level of importance.

FIG. 9 is an example NAL structure of H.265/HEVC. Numbers appearing on the left side of the drawing are provided only for the convenience sake.

Like H.264/AVC, nal_unit_type is described in H. 265/HEVC in the third row of FIG. 9, and allows identification of the picture type and determination of the level of importance. In addition, nuh_temporal_id_plus1 is described in H.265/HEVC in the fifth row of FIG. 9, and newly describes a temporal ID (or the number indicating a coding layer in the hierarchy coding in a time direction).

Figure 10:
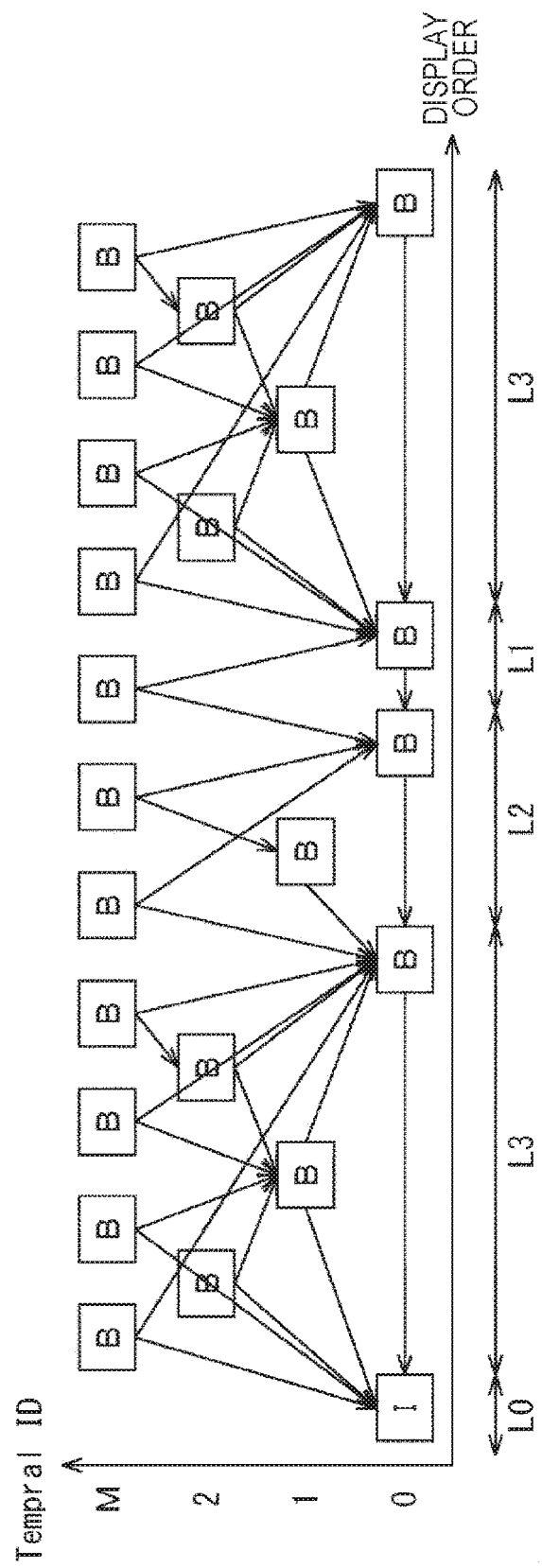
FIG. 10 is an example encoding structure of H.265/HEVC.

FIG. 10 illustrates an encoding structure of H.265/HEVC. This encoding structure is determined by the encoder of the transmitting apparatus 51 or the like, with each picture having a reference relationship with time hierarchy. The receiving apparatus 52 can refer to the temporal ID to detect hierarchy of the picture that belongs to each NAL unit. The temporal ID indicates pictures whose reference relationship is denser in lower levels of hierarchy, and are important for restoring in the inter-time-layer relationship. In addition, as an SOP structure, the pictures in the same level of hierarchy have a dense reference relationship and highly dependent on other pictures when the pictures come to fall in L3. From these characteristics, the levels of importance of the pictures can be allocated.

This is the example of determining the levels of importance from the packet type and the reference relationship determined from the NAL headers and the encoding structure of H.264/AVC or H.265/HEVC. Alternatively, the identification of the packet type and the determination of the levels of importance can be performed by referring to VPS, PPS, SPS, SEI, meta information, or Slice headers.

Meanwhile, the SI/PSI, other meta information or the like can also be an index of the levels of importance of the packet. For example, PMT or PMT is regarded as an important packet, because PMT or PMT includes PID or various kinds of stream information of ES or SI/PSI and, without receiving such information, the entire control including reproduction, recording, retransmission, and so on would be affected.

[2. Identify the Packet to be Corrected]

Now, take MPEG2-TS and MMT as an example syntax to be referred to for identifying a packet to be corrected. Some parameters described in headers or meta information of each format are important indices in synchronization and multiplexing/separating of packets. If, therefore, an error occurs in a packet, the packet is extracted as the target of correction.

Figure 11:
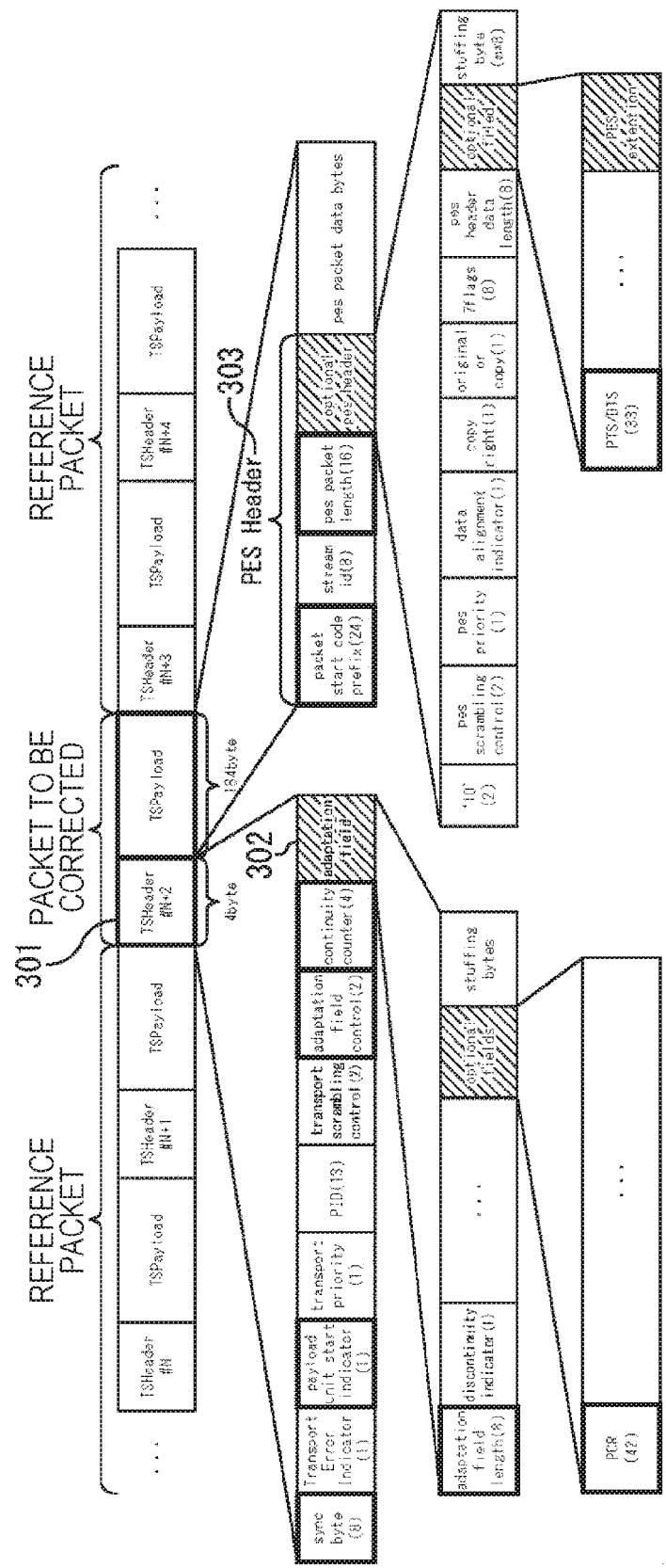
FIG. 11 is an example TS and PES structure of MPEG2-TS.
Figure 12:
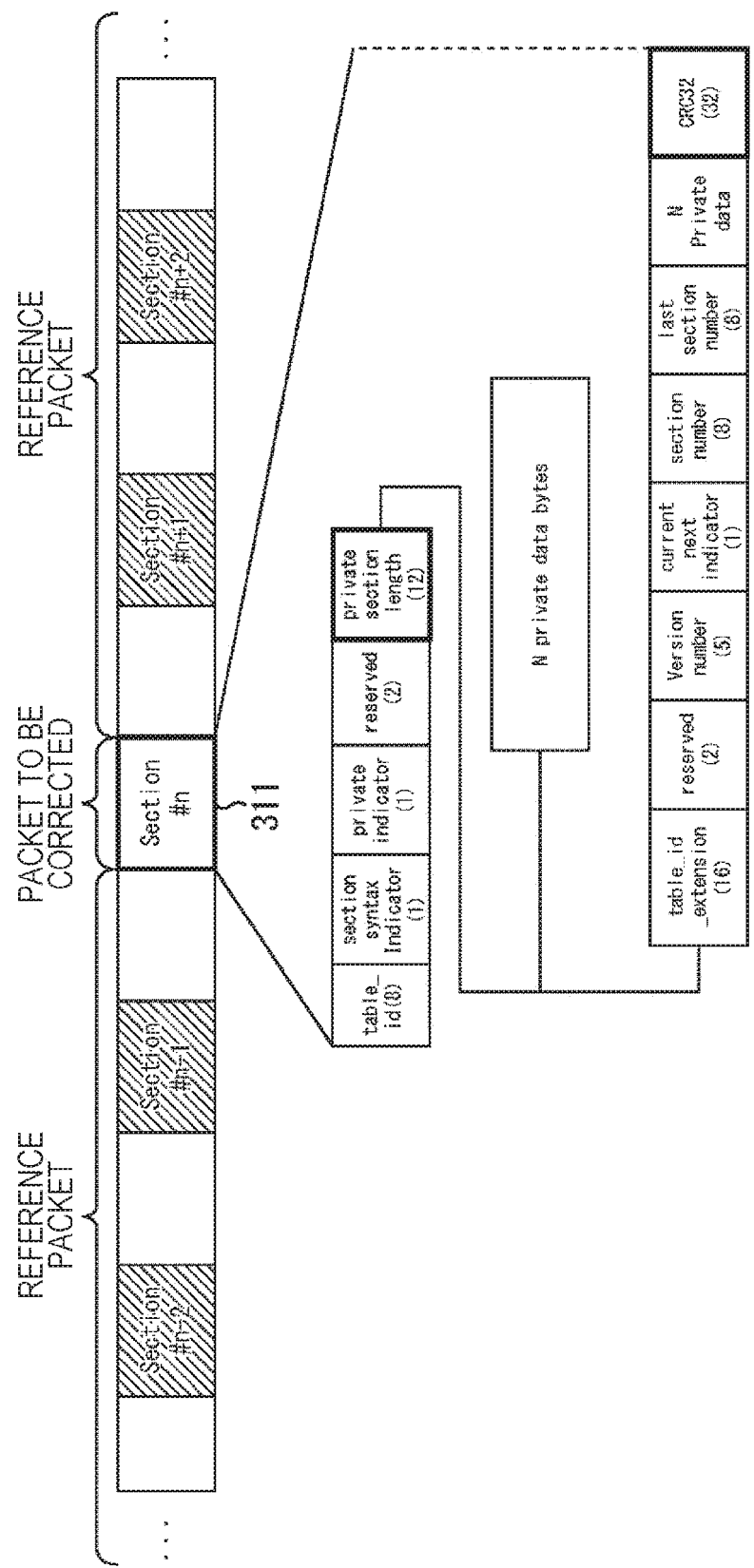
FIG. 12 is an example header structure of Section of MPEG2-TS.

For example, TS packet of MPEG2-TS has a fixed-length signal structure of 188 bytes in which first 4 bytes form a header structure. An adaptation field, which is a variable length extension header, and payload for transmitting the contents are arranged in the remaining 184 bytes. FIG. 11 is an example TS and PES structure. FIG. 12 is an example header structure of Section. It is noted that portions enclosed by bold lines in the following drawings store important information.

Now, the syntax which is particularly important for packet extraction is described below by referring to FIGS. 11 and 12.

Important syntax in a TS header region 301 of FIG. 11:
sync_byte: a fixed value of "0x47"
payload_unit_start_idicator: a flag indicating whether the payload includes the head of PES or Section
adaptation_field_control: arrangement structure of the adaptation field in the TS payload
coutinuity_counter: packet counters having the identical PID Important syntax in a TS extension header region 302 of FIG. 11:
adaptation_field_length Important syntax in a PES header region 303 of FIG. 11:
packet_start_code_prefix: a fixed value of "0x00001"
PSE_packet_length: a byte length of PES packet Important syntax in a header region 311 of Section in FIG. 12:
section_length: a byte length of Section
CRC32: 32 bit error-detecting code.

The error correcting unit 103 detects, for example, whether there is an error in such syntax. In doing this, a bit estimation of the packet to be corrected is performed by referring to the packet information before and after the packet to be corrected which has previously been stored. If the estimated value differs from an actual value, the occurrence of an error is determined.

In particular, transport error indicator in the TS header is a flag indicating the possibility of error in the packet and is used, for example, in a case where the demodulator has failed error correction. Thus, if the packet has "1", the packet may be corrected intensively. Further, a program clock reference (PCR) in the TS extension header region or presented time/decoding time (PTS/DTS) in the optional region of the PES header are important time information in synchronization control or reproduction or recording control. Since such information has a linear correlation with the packets before and after the packet to be corrected, Correction can be performed in the receiving apparatus 52 by calculation from the preceding and succeeding values.

Figure 13:
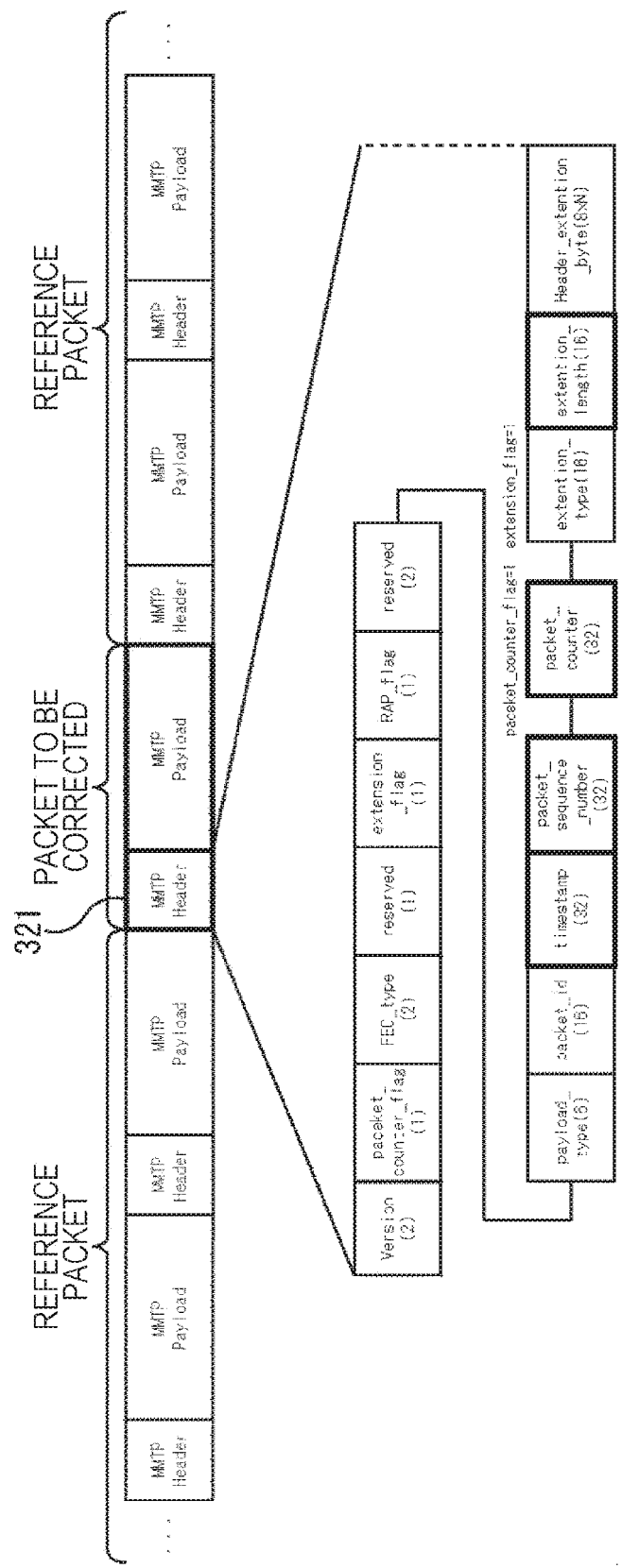
FIG. 13 illustrates a header structure of an MMT packet.
Figure 14:
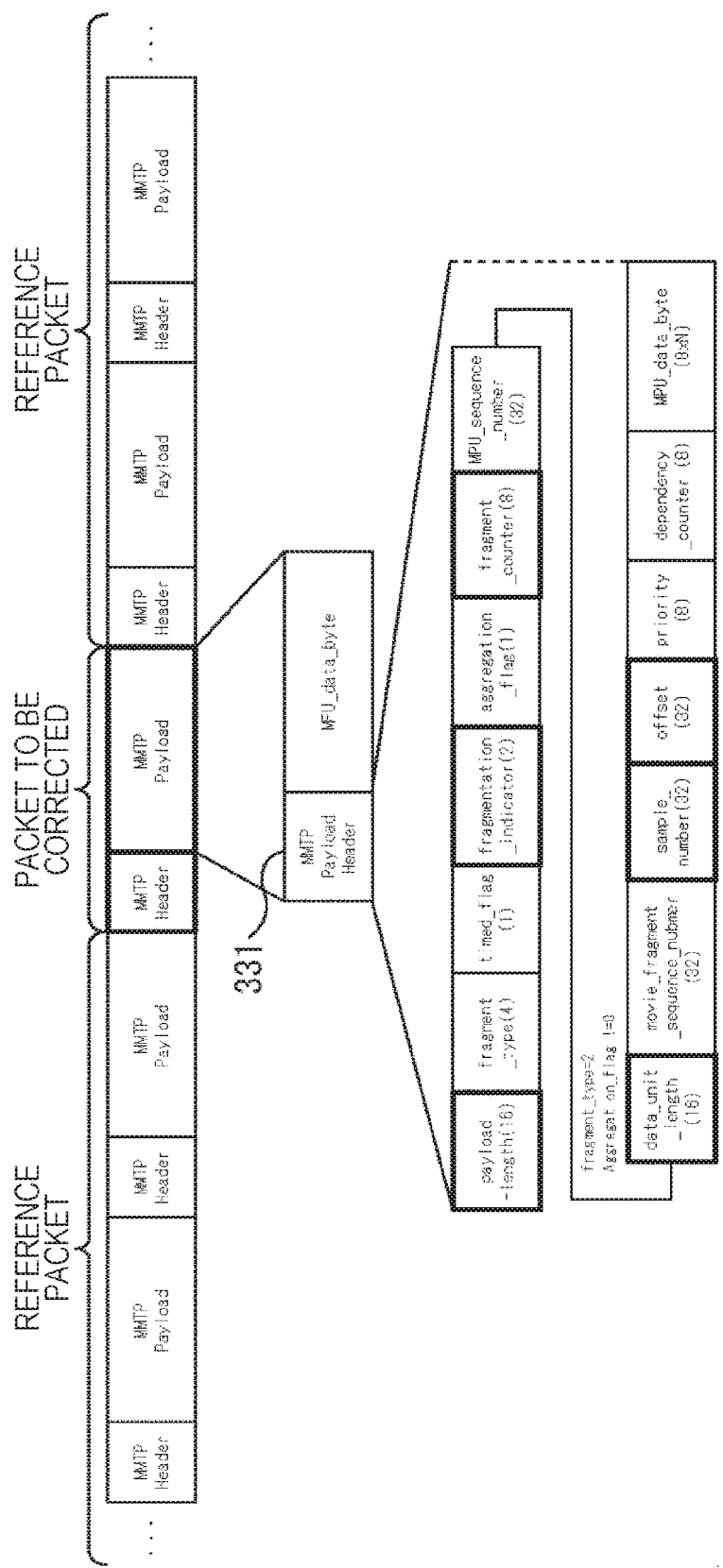
FIG. 14 illustrates a header structure of an MMTP payload.
Figure 15:
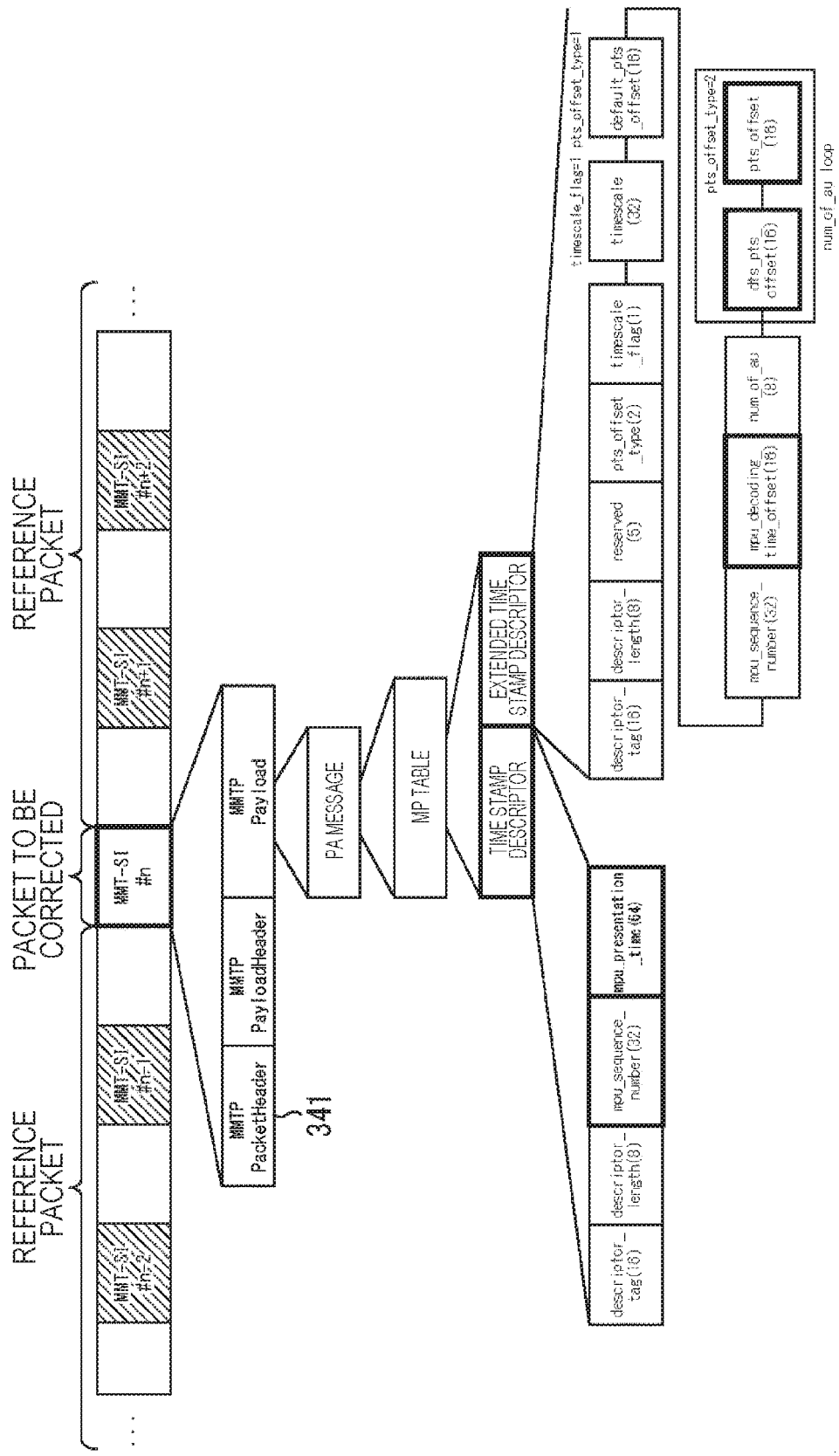
FIG. 15 illustrates a structure of an MMT-SI time stamp/extended time stamp descriptor.

For example, there are a media fragment unit (MFU), a media processing unit (MPU), MMTP payload, and an MMTP packet as elements constituting the encode signal in MMT. Now, take the syntax of the MMTP packet and the MMTP payload as examples. FIG. 13 illustrates a header structure of the MMT packet. FIG. 14 illustrates a header structure of the MMTP payload. FIG. 15 illustrates a structure of an MMT-SI time stamp/extended time stamp descriptor.

Now, the syntax which is particularly important for packet extraction is described below by referring to FIGS. 13 to 15.

Important in a MMTP packet header 321 of FIG. 13:
packet_sequence_number: a packet sequence number
packet_counter: an MMTP packet counter in the same IP data flow
extension_length: a byte length of the extended header region.

Important in an MMTP payload header 331 of FIG. 14:
payload_length: an MMTP payload length
fragmentation_indicator: a dividing state of data to be stored in the MMTP payload
fragment_counter: a division number counter
data_unit_length: a byte length of MPU data
offset: an MPU offset byte in a sample to which the MFU belongs.

such syntax can also refer to the interior of the packet or the packets before and after the packet to be corrected similarly to MPEG2-TS, estimates bits of the packet to be corrected, and determines the occurrence of the error if the estimated value does not match.

In addition, as illustrated in FIG. 15, various kinds of time information are transmitted via MMT, such as timestamp in the MMTP packet header, a time stamp descriptor (mpu_presentation_time) for describing in the MMT-SI-MP table (MPT), and an extension time stamp descriptor adopted by the ARIB MMT (mpu_decoding_time_offset, dts_pts_offset, pts_offset), and these time information are important in synchronization control and reproduction and recording control.

For example, mpu_presentation_time, mpu_decoding_time_offset have the time correlation with the packets having the same MPU sequence number before and after the packet to be corrected, so that the correction can be performed in the receiving apparatus 52 by calculation of the preceding and succeeding values. In addition, dts_pts_offset, pts_offset can be corrected from the preceding and succeeding values in the same MPT.

The example of MPEG2-TS and MMT have been described above, but both save at least one piece of congeneric packet information that has been multiplexed before and after the target packet in the stream, and the error in the syntax is identified from the packet. The number of reference packets may be a fixed number or may be changed dynamically according to the user instruction or in the receiving apparatus 52. The number of reference packets affects the memory resource and reproduction delay of the receiving apparatus 52, and is determined for each receiving apparatus 52.

[3. Select and Execute Packet Correction]

Priority for correction is further allocated to each syntax illustrated in FIGS. 11 to 15. For example, a TS sets a high priority to the syntax, such as sync_byte, adaptation_field_control, or continuity_counter which are indispensable for restoration of packet data is set to have a high priority. Subsequently, the priority for correction is allocated for each check term, such as a PCR or a PTS/DTS which is not indispensable for restoration of the packet but affects or not directly affects video and audio reproduction. The result and the level of importance of the packet that has been extracted in [1] above are mapped to generate and save the packet correction table. The receiving apparatus 52 selects the correcting method in accordance with the correction table.

FIG. 16 is an example packet correction table of H.264/AVC.

The packet correction table of FIG. 16 illustrates that, from top to bottom, "Priority" is High when "Packet Type" is VideoES, "Pict Type" is picture I, "nal_unit_type of NAL Header" is IDR, and "nal_ref_idc of NAL Header" is a reference picture. It is illustrated that the "Priority" is High when the "Packet Type" is Section (PAT, PMT).

It is illustrated that the "Priority" is Middle when "Packet Type" is VideoES, "Pict Type" is picture I/P/B, "nal_unit_type of NAL Header" is non-IDR, and "nal_ref_idc of NAL Header" is a reference picture. It is illustrated that the "Priority" is Low when "Packet Type" is VideoES, "Pict Type" is picture B, "nal_unit_type of NAL Header" is non-IDR, and "nal_ref_idc of NAL Header" is a non-reference picture. It is illustrated that t "Priority" is Low when "Packet Type" is Section (other than PAT, PMT).

For example, if the performance of the receiving apparatus 52 has dropped according to the statistics information in step S210 of FIG. 7, the packet of high priority is selected as the packet to be corrected from the packet correction table of FIG. 16. For example, if the performance of the receiving apparatus 52 is favorable according to the statistics information in step S210 of FIG. 7, the packet of middle or possibly low priority in addition to the packet of high priority are selected as the packets to be corrected from the packet correction table of FIG. 16.

Thus, the target of correction is selected according to the statistics information and from the packet correction table in the case of FIG. 16.

FIG. 17 is an example of packet correction table of H.265/HEVC.

The packet correction table of FIG. 17 illustrates that, from top to bottom, "Priority" is High when "Packet Type" is VideoES, "Pict Type" is picture I, "nal_unit_type of NAL Header" is IDR, "Temporal ID of NAL Header" is 0, and "SOP Layer" is L0. It is illustrated that the "Priority" is High when the "Packet Type" is Section (PAT, PMT).

It is illustrated that the "Priority" is Middle when "Packet Type" is VideoES, "Pict Type" is picture I/P/B, "nal_unit_type of NAL Header" is non-IDR, and "Temporal ID of NAL Header" is 0, and "SOP Layer" is L1/L2/L3. It is illustrated that the "Priority" is Middle when "Packet Type" is VideoES, "Pict Type" is picture B, "nal_unit_type of NAL Header" is non-IDR, and "Temporal ID of NAL Header" is 1, and "SOP Layer" is L3.

It is illustrated that the "Priority" is Middle when "Packet Type" is VideoES, "Pict Type" is picture B, "nal_unit_type of NAL Header" is non-IDR, and "Temporal ID of NAL Header" is 1, and "SOP Layer" is L2. It is illustrated that the "Priority" is Middle when "Packet Type" is VideoES, "Pict Type" is picture B, "nal_unit_type of NAL Header" is non-IDR, and "Temporal ID of NAL Header" is 2, and "SOP Layer" is L3.

It is illustrated that the "Priority" is Low when "Packet Type" is VideoES, "Pict Type" is picture B, "nal_unit_type of NAL Header" is non-IDR, and "Temporal ID of NAL Header" is 3, and "SOP Layer" is L1/L2/L3. It is illustrated that t "Priority" is Low when "Packet Type" is Section (other than PAT, PMT).

For example, if the performance of the receiving apparatus 52 has dropped according to the statistics information in step S210 of FIG. 7, the packet of high priority is selected as the packet to be corrected from the packet correction table of FIG. 17. For example, if the performance of the receiving apparatus 52 is favorable according to the statistics information in step S210 of FIG. 7, the packet of middle or possibly low priority in addition to the packet of high priority are selected as the packets to be corrected from the packet correction table of FIG. 17.

It is noted that not only the size of the correction range of the packet to be corrected but also the level of the correction accuracy may be controlled depending on the quality of performance. Alternatively, both the size of the correction range and the quality of performance may be controlled. Thus, the correcting method is provided by combining the target of correction, the range of correction, and the accuracy of correction selected in step S210 of FIG. 7.

Thus, the target of correction is selected according to the statistics information and from the packet correction table in the case of FIG. 17.

In other words, the error correction table, the execution or non-execution of the error correction, and the execution range specification on the stream are determined, for example, according to the receiving status on the receiving apparatus 52, the process status, and the past statistic information as follows.

- Increase the accumulated amount and the calculation amount of the reference data to correct more accurately, if the resource load of the receiving apparatus 52 is low. In contrast, correct only the packet having a high level of importance, if the resource load is high. Alternatively, the correction accuracy is lowered.
- Increase the correction intensity, if discontinuity or Skip/Repeat continues during reproduction.
- Turn off the error correction itself, if the low receiving status continues.

Thus, determination can be made according to various conditions.

In the above description, the error correcting unit dynamically generates the packet correction table for certain number of packets and selects the correcting method. Alternatively, a user-specified method or a fixed value may be used.

<Modification>

It is noted that the method of assigning priority according to the original information in the stream (e.g., syntax, packet type, and encoding type) has been described as an example of determining the level of importance of the packet. Alternatively, priority information may be sent in advance from the transmitting apparatus 51 to the syntax or meta information in the stream to allow the receiving apparatus 52 to refer to such priority information. In addition, the receiving apparatus 52 may function as a retransmitting apparatus and insert the priority information during the multiplexing process.

Further, although MPEG2-TS and MMT have been described as examples of detecting the packet to be corrected, the packet correction can similarly be performed in another level of hierarchy in the transmission protocol, such as a format including MPEG-DASH, ISOBMFF, and so on, or TLV, UDP, IP packet that have been adopted in the ARIB transmission method. Accordingly, the selection of the correcting method can also be switched hierarchically.

In the above description, the receiving apparatus corrects the packet error even when the error occurs in the stream received during the low transmission status, and the following effect can be obtained.

The present technology prevents or alleviates the discontinuous operation during the reproduction and viewing, and improves the reproduction quality.

The present technology can improve the quality of the reused stream in recording and retransmission.

Since the present technology can adaptively switch the two things described above in the receiving apparatus, the processing load can be decreased and the quality can be improved efficiently.

<Personal Computer>

A series of processing steps described above can be executed by hardware or can be executed by software. In a case where the series of processing steps is executed by software, a program constituting the software is installed in a computer. Here, the computer includes a computer that is incorporated in dedicated hardware, a computer that can execute various functions with various programs installed, such as a general personal computer, and the like.

Figure 18:
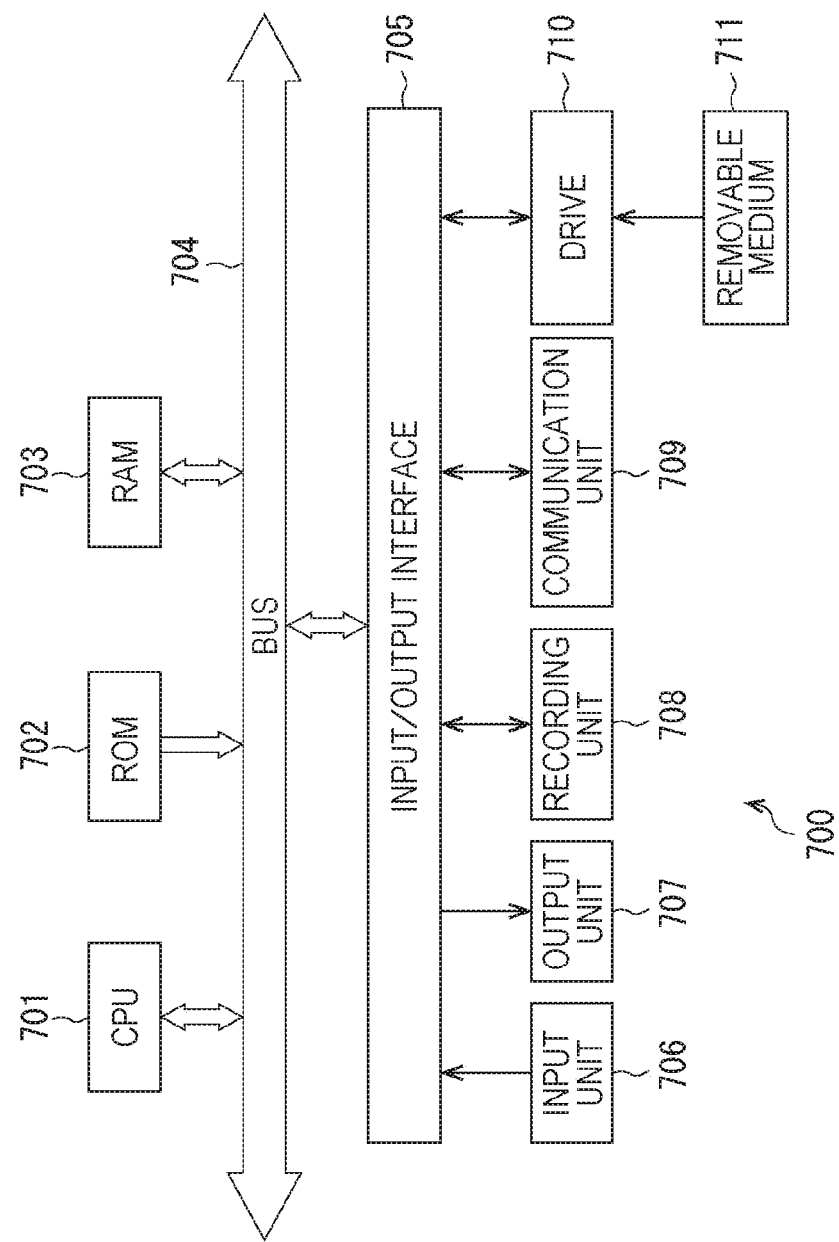
FIG. 18 is a block diagram illustrating an example configuration of a personal computer.

FIG. 18 is a block diagram illustrating a configuration example of hardware of a personal computer for executing the series of processing steps described above with a program.

In the personal computer 700, a central processing unit (CPU) 701, a read only memory (ROM) 702, and a random access memory (RAM) 703 are connected to one another via a bus 704.

An input/output interface 705 is further connected to the bus 704. To the input/output interface 705, an input unit 706, an output unit 707, a storage unit 708, a communication unit 709, and a drive 710 are connected.

The input unit 706 includes a keyboard, a mouse, a microphone, and the like. The output unit 707 includes a display, a speaker, and the like. The storage unit 708 includes a hard disk, a nonvolatile memory, and the like. The communication unit 709 includes a network interface and the like. The drive 710 drives a removable medium 711 such as a magnetic disk, an optical disk, a magneto-optical disk, or a semiconductor memory.

In the personal computer 700 configured in the above manner, the CPU 701 will load, for example, the program stored in the storage unit 708, via the input/output interface 705 and the bus 704 to the RAM 703 and execute it. Thus, the series of processing steps described above are performed.

The program executed by the computer (CPU 701) can be provided as a recorded medium such as a removable medium 711. The removable medium 711 is, for example, a magnetic disc (including flexible disc), an optical disc (including compact disc-read only memory (CD-ROM), a digital versatile disc (DVD)), an optical magnetic disc, or a packaged medium including a semiconductor memory or the like. In addition, the program can also be provided via a wired or wireless transmission medium, such as a local area network, the Internet, or digital satellite broadcasting.

In the computer, the program can be installed in the storage unit 708 via the input/output interface 705 by inserting the removable medium 711 into the drive 710. In addition, the program can be received by the communication unit 709 via a wired or wireless transmission medium and installed in the storage unit 708. Moreover, the program can be installed in advance in the ROM 702 or the storage unit 708.

It is noted that the program executed by the computer can be a program for which processing steps are performed in a chronological order along a sequence described in this specification, or can be a program for which processing steps are performed in parallel or at appropriate timing when called.

In addition, in the present specification, those steps describing the program recorded in the recording medium are indeed performed in the chronological order along the described sequence. The steps, however, may not always be processed in the chronological order and, instead, may be executed in parallel or individually.

Meanwhile, the system as used in the present specification refers to the entire apparatus including a plurality of devices.

It is noted that the embodiments of the present disclosure are not limited to the embodiments described above, and various changes may be made in a range without departing from the spirit of the present disclosure.

For example, the present disclosure can adopt a cloud computing configuration in which a single function is processed by a plurality of devices via a network in a distributed and shared manner.

Meanwhile, the constituent component described above as a single device (or processing unit) may be divided and provided as a plurality of devices (or processing units). In contrast, a plurality of devices (or processing units) described above may be combined and provided as a single device (or processing unit). In addition, each device (or each processing unit) may indeed include constituent components other than those described above. Further, a part of the configuration of a certain device (or processing unit) may be included in the configuration of another device (or another processing unit) as long as the entire system configuration or operation is substantially the same. In other words, the present technology is not limited to the embodiments described above, and various changes may be made in a range without departing from the spirit of the present technology.

In the above description, the preferred embodiments of the present disclosure have been described in detail referring to the appended figures, but the disclosure is not limited to such embodiments. Apparently, those who are ordinarily skilled in the art can conceive various modifications or alterations within the technical scope of the appended claims and such forms are indeed understood as would fall within the technical scope of the invention.

It is noted that the present technology may also be provided in the following configuration:

(1)

A receiving apparatus, including an extracting unit that extracts packet information from a stream including video data, audio data, and control information, an error detecting unit that detects a packet error in the stream, a correcting method selecting unit that selects a correcting method of the packet error detected by the error detecting unit in accordance with the packet information extracted by the extracting unit and a condition of receiving processing, and a correcting unit that corrects the packet error detected by the error detecting unit in accordance with the correcting method selected by the correcting method selecting unit.

(2)

The receiving apparatus as recited in (1) above, further including an accumulating unit that accumulates the packet information extracted by the extracting unit, in which the correcting unit estimates a bit pattern from the packet information accumulated in the accumulating unit and corrects syntax to correct the packet error detected by the error detecting unit.

(3)

The receiving apparatus as recited in (1) or (2) above, further including a correction table generating unit that generates a correction table assigned with priority for correction in accordance with the packet information extracted by the extracting unit, in which the correcting method selecting unit selects the correcting method of the packet error detected by the error detecting unit in accordance with at least the correction table generated by the correction table generating unit or the condition of the receiving process.

(4)

The receiving apparatus as recited in any one of (1) to (3) above, in which the packet information includes packet type information.

(5)

The correcting apparatus as recited in any one of (1) to (4) above, in which the correcting method includes at least one of a target of correction, a range of correction, and accuracy of correction.

(6)

A receiving method causing a receiving apparatus to perform extracting packet information from a stream including video data, audio data, and control signal, detecting a packet error in the stream, selecting a correcting method of the detected packet error in accordance with the extracted packet information and a condition of receiving processing, and correcting the detected packet error in accordance with the selected correcting method.

REFERENCE SIGNS LIST

51 Transmitting apparatus
52 Receiving apparatus
102 Multiplexing/separating unit
103 Error correcting unit
104 Control information buffer
105 Decoder buffer
106 Control information packet analyzing unit
107 Video/audio synchronization control unit
108 Video/audio decoding unit
110 Control information generating/packetizing unit
111 Re-multiplexing unit
112 Recording medium
151 Packet filter
152 Packet separating unit
201 Packet identifying unit
202 Error determining unit
203 Packet-correction-table generating unit
204 Packet accumulating unit
205 Packet-correcting-method selecting unit
206 Statistics information accumulating unit
207 Packet correcting unit

The invention claimed is:

1. A receiving apparatus, comprising:
at least one processor configured to:
extract packet information from a packet to be corrected in a stream, wherein the stream includes video data, audio data, and control information;
detect a packet error in the stream;
select a correcting method for the detected packet error based on the extracted packet information and a condition of a reception process, wherein the correcting method indicates one of a type or a priority of the packet to be corrected; and
correct the detected packet error based on the selected correcting method.

2. The receiving apparatus according to claim 1, wherein the at least one processor is further configured to:
accumulate the extracted packet information;
estimate a bit pattern from the accumulated packet information; and
correct the detected packet error by syntax correction.

3. The receiving apparatus according to claim 1, wherein the at least one processor is further configured to:
generate a correction table assigned with priority for correction based on the extracted packet information; and
select the correcting method for the detected packet error based on at least one of the generated correction table or the condition of the reception process.

4. The receiving apparatus according to claim 1, wherein the packet information includes packet type information.

5. The receiving apparatus according to claim 1, wherein the correcting method includes at least one of a target of correction, a range of correction, or an accuracy of correction.

6. A receiving method, comprising:
in a receiving apparatus:
extracting, by at least one processor of the receiving apparatus, packet information from a packet to be corrected in a stream, wherein the stream includes video data, audio data, and control information;
detecting, by the at least one processor, a packet error in the stream;
selecting, by the at least one processor, a correcting method for the detected packet error based on the extracted packet information and a condition of receiving processing, wherein the correcting method indicates one of a type or a priority of the packet to be corrected; and correcting, by the at least one processor, the detected packet error based on the selected correcting method.

\* \* \* \* \*